United States Patent
Gardner et al.

[11] Patent Number: 5,883,456
[45] Date of Patent: Mar. 16, 1999

[54] GENERATOR ROTOR AND METHOD FOR ELIMINATING KEYWAY STRESS CRACKS IN SAME

[75] Inventors: William Cannon Gardner, Casselberry; Stephen Thomas Soto, Winter Park, both of Fla.

[73] Assignee: Siemens Westinghouse Power Corporation, Orlando, Fla.

[21] Appl. No.: 954,604

[22] Filed: Oct. 20, 1997

[51] Int. Cl.⁶ .................................................. H02K 15/14
[52] U.S. Cl. ............................ 310/270; 310/271; 29/598
[58] Field of Search .................................. 310/270, 271; 29/598

[56] References Cited

U.S. PATENT DOCUMENTS

| | | | |
|---|---|---|---|
| 4,633,554 | 1/1987 | Clark et al. | 29/156.4 R |
| 4,893,388 | 1/1990 | Amos et al. | 29/156.8 R |
| 5,085,363 | 2/1992 | Sims | 228/119 |
| 5,174,011 | 12/1992 | Weigelt | 29/598 |
| 5,528,097 | 6/1996 | Gardner et al. | 310/270 |

*Primary Examiner*—Nestor Ramirez
*Assistant Examiner*—B. Mullins

[57] ABSTRACT

A method for repairing stress-induced cracks in a generator rotor keyway is disclosed. The method comprises disassembling the retaining ring and ring key from the rotor, and machining away the crack and surrounding rotor metal from the rotor keyway. The machining step may be performed in a lathe or milling machine. This method diminishes the labor cost, equipment cost, and down time required for crack repairs because the slot contents may remain in the slots during the entire repair process. A spacer ring and an enlarged key that may be inserted into the machined, enlarged keyway are also disclosed.

13 Claims, 6 Drawing Sheets

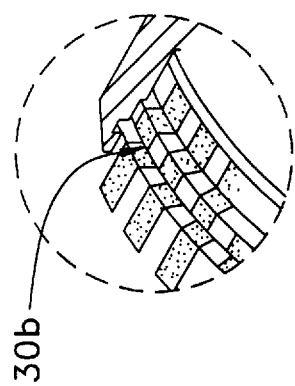
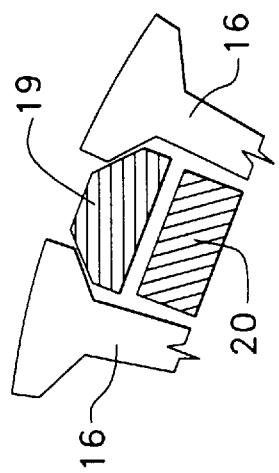
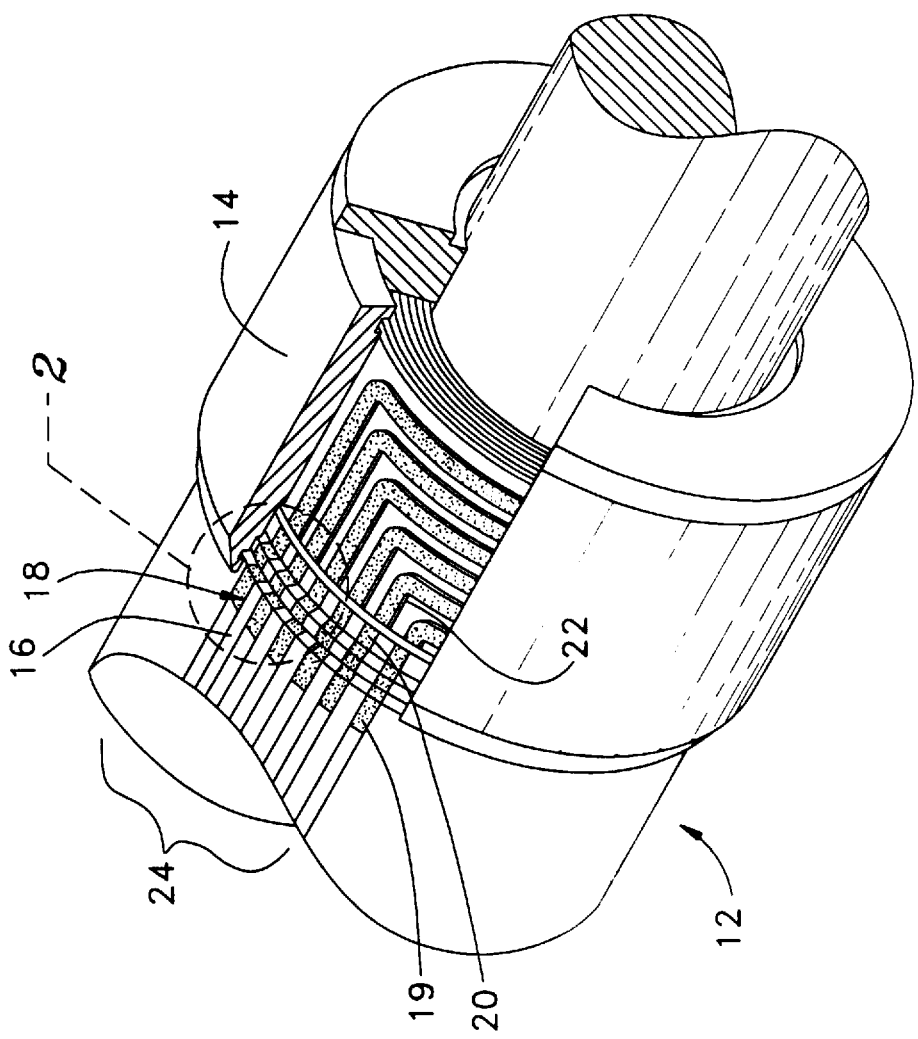
FIG. 2
FIG. 3
FIG. 1

GENERATOR ROTOR AND METHOD FOR ELIMINATING KEYWAY STRESS CRACKS IN SAME

FIELD OF THE INVENTION

This invention relates to generators for producing electricity, and more particularly, to repair of generator rotors having retaining rings.

BACKGROUND

Generator rotors have a cylindrical rotor body from which two shafts extend at each rotor end. The rotor is angularly divided into teeth regions and pole regions. The teeth regions have a series of teeth that are defined by longitudinal slots cut into the rotor. The slots contain field windings and wedges for holding the windings in place against centrifugal force caused by the rotor rotation.

Co-pending U.S. patent application Ser. No. 08/819,433, filed Mar. 17, 1997 (Assignee Docket No. P96-002), which is assigned to the assignee of the present invention and is incorporated herein by reference in its entirety, describes such a generator rotor.

Thermal expansion of the windings, as well as other forces, often cause stress-induced cracking of the rotor. A long retaining ring attachment modification to repair such cracks is often part of a reconditioning program after prolonged rotor use. Such a modification requires replacing the retaining ring, often requires rewinding of the rotor, and requires significant down-time. U.S. Pat. No. 5,528,097 to Gardner et al., which is assigned to the assignee of the present invention and incorporated herein by reference in its entirety, describes modifications to a rotor/retaining ring system.

There is a need for a method of repairing rotor stress cracking that diminishes the downtime and cost associated with the long retaining ring modification.

SUMMARY

A method for repairing stress-induced cracks from the teeth region of a generator rotor keyway is provided. The method according to the present invention enables such crack repair without removing the windings and wedges from the rotor slots. Such method employs the existing retaining ring, thereby diminishing the cost of crack repair associated with the long retaining ring modification. This method also diminishes labor costs and down time required for rewinding.

The method according to the present invention comprises the steps of disassembling a retaining ring and ring key from each end of the rotor while retaining the slot contents, for example, windings and wedges, in the slots. A stress-induced crack, which typically forms on the outboard side of the keyway, is machined away. The machining step preferably includes machining rotor metal of uniform thickness from an outboard vertical keyway wall and base keyway wall of a rectangular rotor keyway to form an enlarged keyway. Alternatively, the machining step may comprise machining a profile having, preferably, a hybrid elliptical shape to remove cracks and to provide low, preferably the lowest, stress concentration. The term "hybrid elliptical shape" used in this specification and appended claims refers to a smooth, rounded shape that is chosen to provide the lowest stress concentration while being conducive to machining. Preferably, the keyway is machined to a depth that completely cuts out the portion of the rotor having the stress-induced crack. The end wedges may be removed for inspection capability. Therefore, the machining step may be performed with the end wedges either removed or in place.

According to a second aspect of the present invention, a generator rotor having a spacer ring coupled to the enlarged keyway is provided. Preferably, the spacer ring, which may comprise a single ring or ring segments, has a thickness that corresponds to the amount of material machined from the rotor keyway wall. The spacer ring may be sized to create a modified keyway that has similar dimensions to the original keyway. Such a modified keyway enables re-use of the original ring key. The spacer ring may be fabricated by conventional methods from a material similar to that of either the key or the rotor, as will be understood by those familiar with such components.

According to a third aspect of the present invention, a generator rotor having an enlarged ring key that cooperates with the enlarged keyway is provided. The enlarged key has a relatively wide inner portion that cooperates with the enlarged rotor keyway and an outer portion that has a standard width to cooperate with a retaining ring keyway.

BRIEF DESCRIPTION OF THE DRAWINGS

FIG. 1 is a perspective view of a generator rotor of the type employing the present invention;

FIG. 2 is a view of a portion of the rotor of FIG. 1;

FIG. 3 is a sectional view of a teeth region of the generator rotor of FIG. 1;

DESCRIPTION OF PREFERRED EMBODIMENTS

Figure 4:
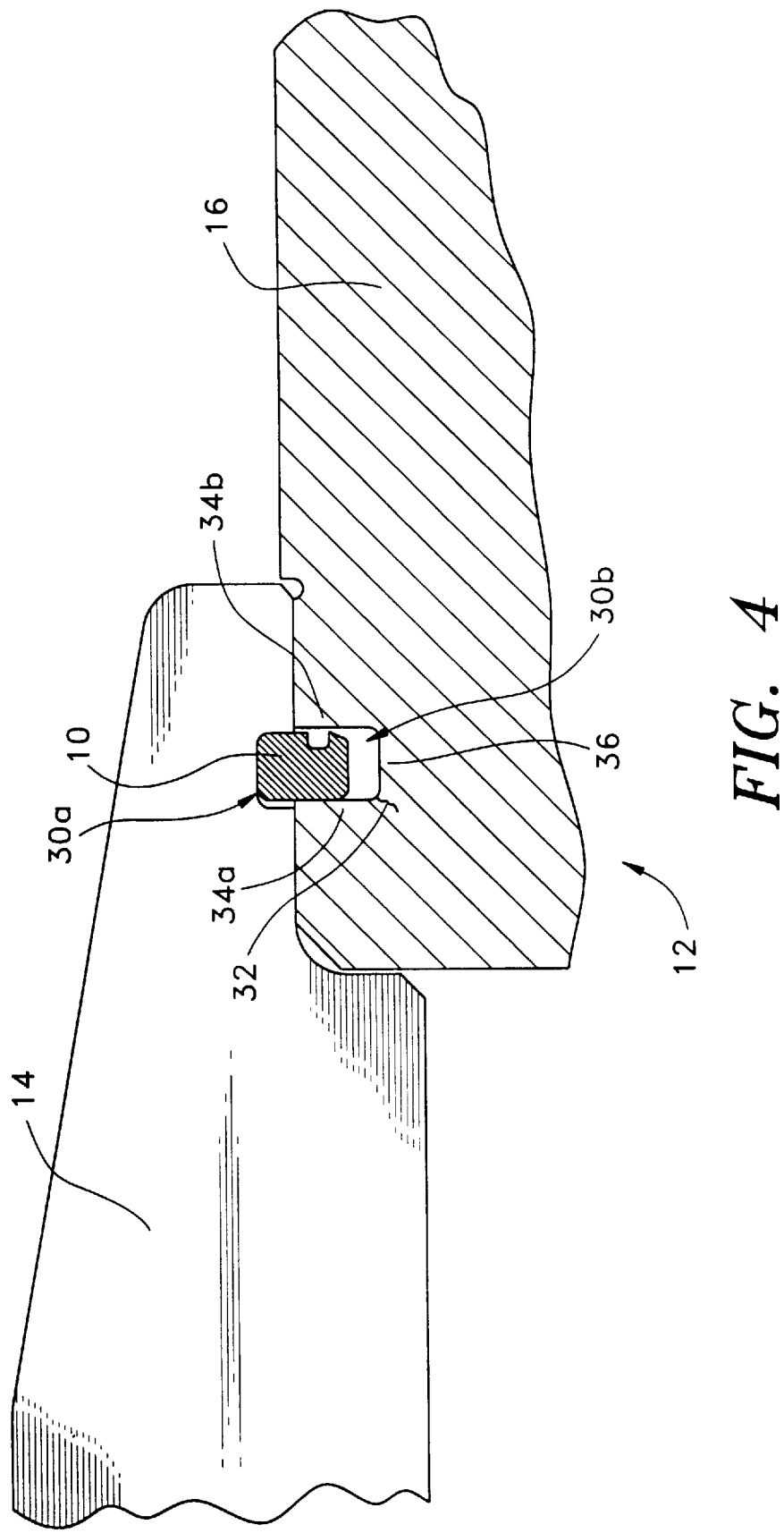
FIG. 4 is a longitudinal cross-sectional view of the generator rotor of FIG. 1.

Referring to FIGS. 1, 2, and 3, there is shown a two pole generator rotor 12 of the type employing the present invention. Each teeth region 24 is formed by several longitudinal slots 18, which are interspaced between a plurality of teeth 16. The teeth 16 and slots 18 typically span the length of the rotor 12. Wedges 19 and field windings 20 are conventionally tightly installed into each of the slots 18. End turns 22 of the windings 20 on each end of the rotor 12 are restrained by a retaining ring 14. The Figures are provided for illustrative purposes only. Specifically, the present invention is not limited to the type of rotor shown in FIGS. 1, 2, and 3, but rather may be employed with rotors of any geometry, as will be understood by those familiar with such rotors.

Referring to FIG. 4, a ring key 10 is located partially within a circumferential retaining ring keyway 30a formed within the retaining ring 14 and partially within an opposing, circumferential rotor keyway 30b formed in the rotor 12. Ring key 10 is omitted from FIGS. 1 and 2 for clarity. Rotor keyway 30b is formed by two opposing vertical rotor keyway sidewalls—an outboard wall 34a and an inboard wall 34b—and by a horizontal rotor wall 36 disposed between walls 34a and 34b. As used in this specification and in the appended claims, the term "keyway wall" includes the particular surface and corresponding rotor metal that forms the surface. After prolonged use of the rotor 12, a crack 32 may form in the body of rotor 12. Typically, crack 32 propagates from near the outboard corner that is formed where walls 34a and 36 meet. However, the present invention is not limited to any particular location or causation of cracking. Rather, the present invention encompasses the methods and devices described herein, regardless of the location or cause of the cracking.

Figure 5B:
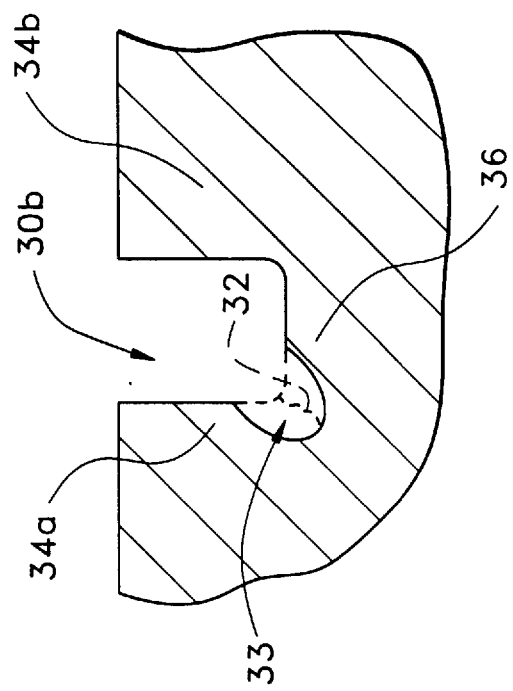
FIGS. 5A and 5B are cross-sectional views of a keyway within a generator rotor according to alternative embodiments of the present invention.
Figure 5A:
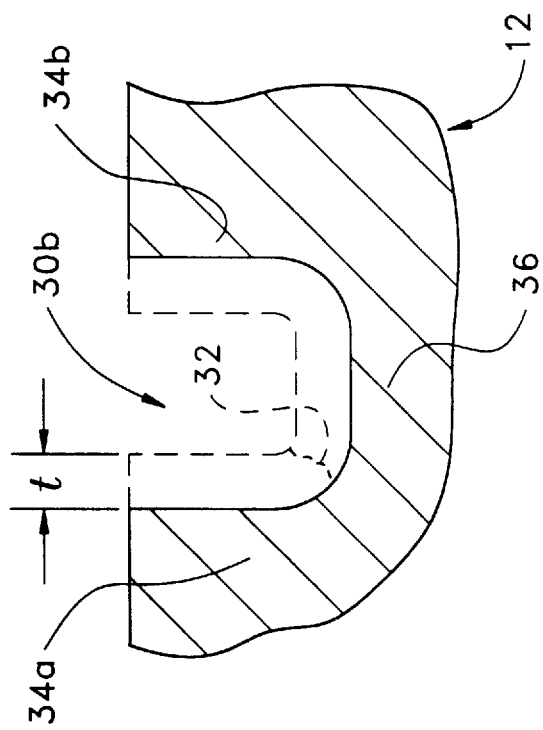

The method for repairing crack 32 according to the present invention will now be described. Rotor 12 is removed from the generator housing. Retaining ring 14 and ring key 10 are removed from each end of rotor 12 to expose walls 34a, 34b, and 36 of rotor keyway 30b. While the windings 20 and wedges 19 are still disposed within the slots 18, keyway 30b of rotor 12 is machined. Alternatively, the machining step may be performed with the wedges 19 removed, which may facilitate inspection. Specifically, as shown in FIG. 5A, a portion is machined from outboard wall portion 34a and base wall portion 36 so as to cut away the portion of rotor 12 through which crack 32 had propagated. Wall 34 is machined by a dimension t. Optionally, a portion may be machined from inboard wall portion 34b. Alternatively, as shown in FIG. 5B, a groove 33 may be machined around crack 32. FIGS. 5A and 5B show the original keyway 30b wall surfaces in relief.

Preferably, the machining step is performed by placing rotor 12 in a lathe and turning rotor 12 at an appropriate speed for machining of keyway 30b. Such machining, using a substantially fixed cutting tool, may be similar to final rotor machining during rotor manufacturing. Also, the machining step may be performed by a milling operation using a rotating cutting tool, as will be understood by those familiar with such machining operations. Regardless of the method of machining of keyway 30b, the machining step should remove crack 32 while slot conduits 19 and 20 are disposed within slots 18. The rotor removing and machining steps preferably also include measures to protect the rotor while transporting, setting up machining, and machining the rotor. Such protective measures include protecting the rotor shaft from gouging during rigging and lifting the rotor 12, and masking appropriate parts (including the end windings, windings 19, and wedges 20, where necessary) with plastic and tape during machining to prevent machining debris from contacting or harming such parts. These and other such protective measures will be apparent to those familiar with machining processes.

Figure 6A:
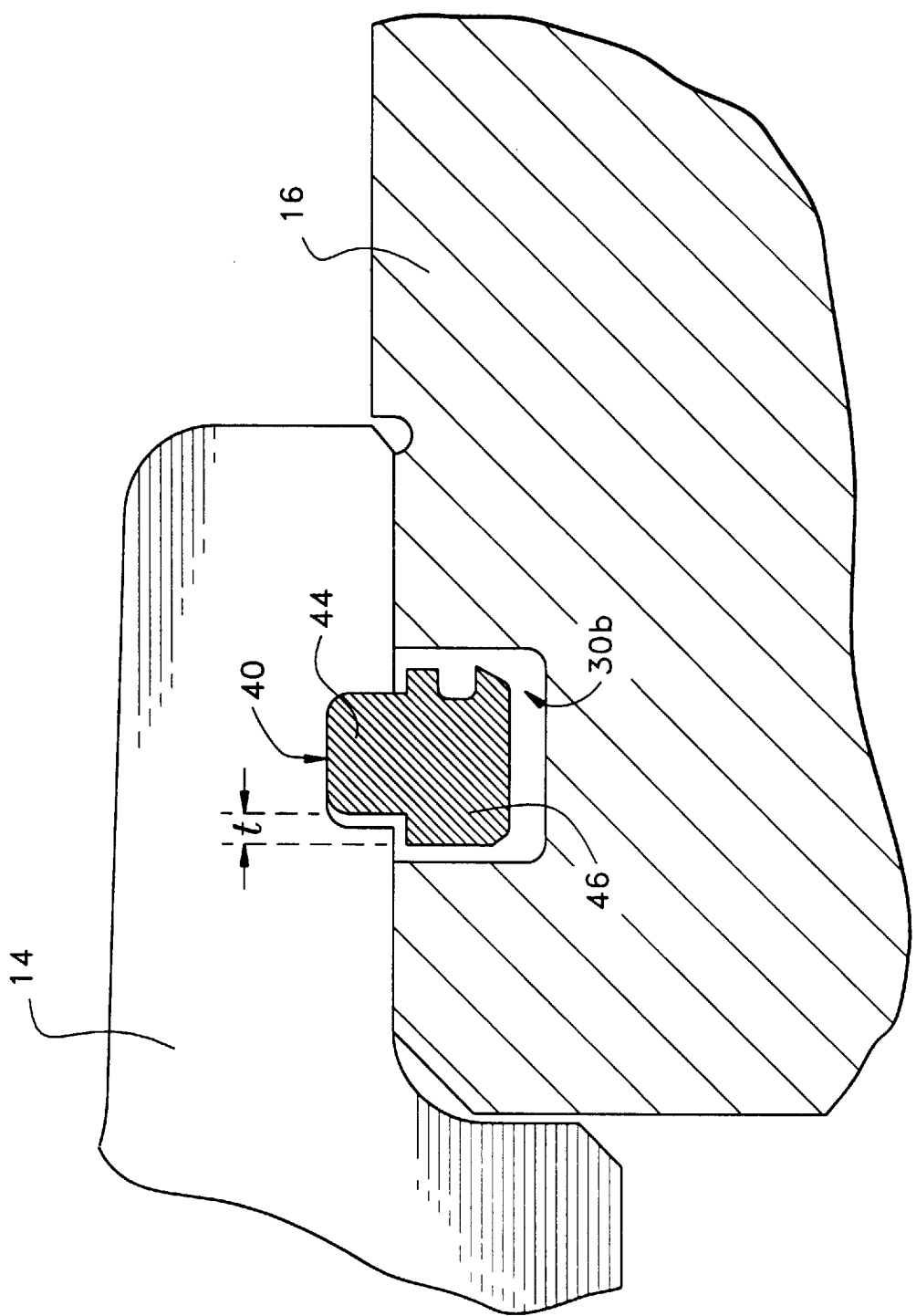
FIGS. 6A, 6B, and 6C are perspective views of the ring key according to aspects of the present invention.

In circumstances in which wall portions 34a and 34b are machined to form the enlarged keyway, an enlarged key 40 may be employed. As shown in FIG. 6A, enlarged key 40 has an outer portion 44, which is designed to be disposed in retaining ring keyway 30a, and an inner portion 46, which is designed to be disposed within rotor keyway 30b. Key inner portion 46 is wider than key outer portion 44 to correspond to the dimension of rotor keyway 30b that was enlarged by the machining step described above.

Figure 6B:
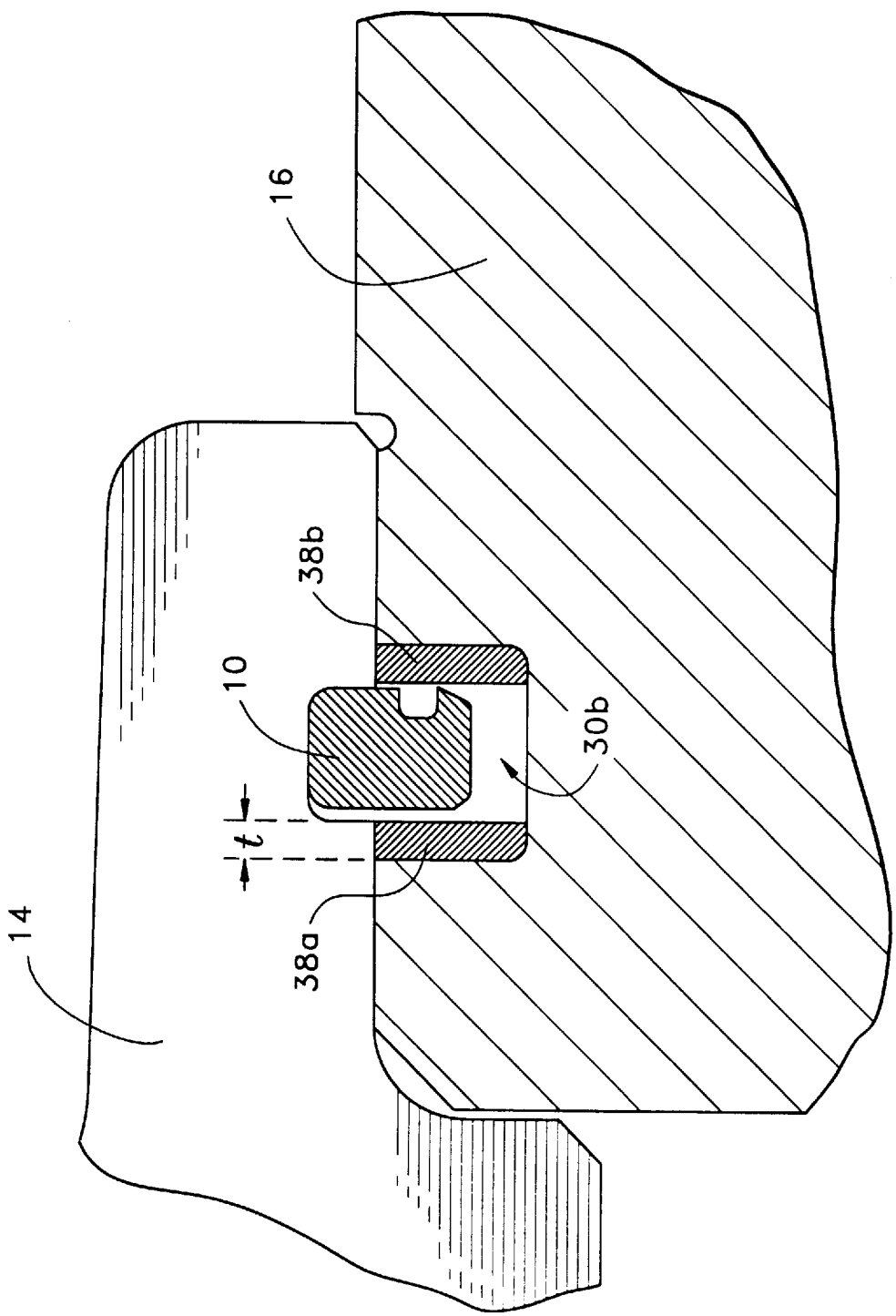

Alternatively, as shown in FIG. 6B, a spacer ring 38a may be inserted into keyway 30a to fill some of the machined-away portion of rotor 12. If inboard wall portion 34b has been machined, a spacer ring 38b may also be employed. Spacer rings 38a, 38b may be sized to re-form keyway 30b to its original dimensions as supplied by the generator rotor manufacturer. Spacer rings 38a,b may be formed of similar material as rotor 12 and may be coupled to rotor 12 by conventional methods, such as recessed machine screws (not shown in FIG. 6B). Alternatively, spacer rings 38a,b may be disposed within keyway 30b but unattached to rotor 12.

Figure 6C:
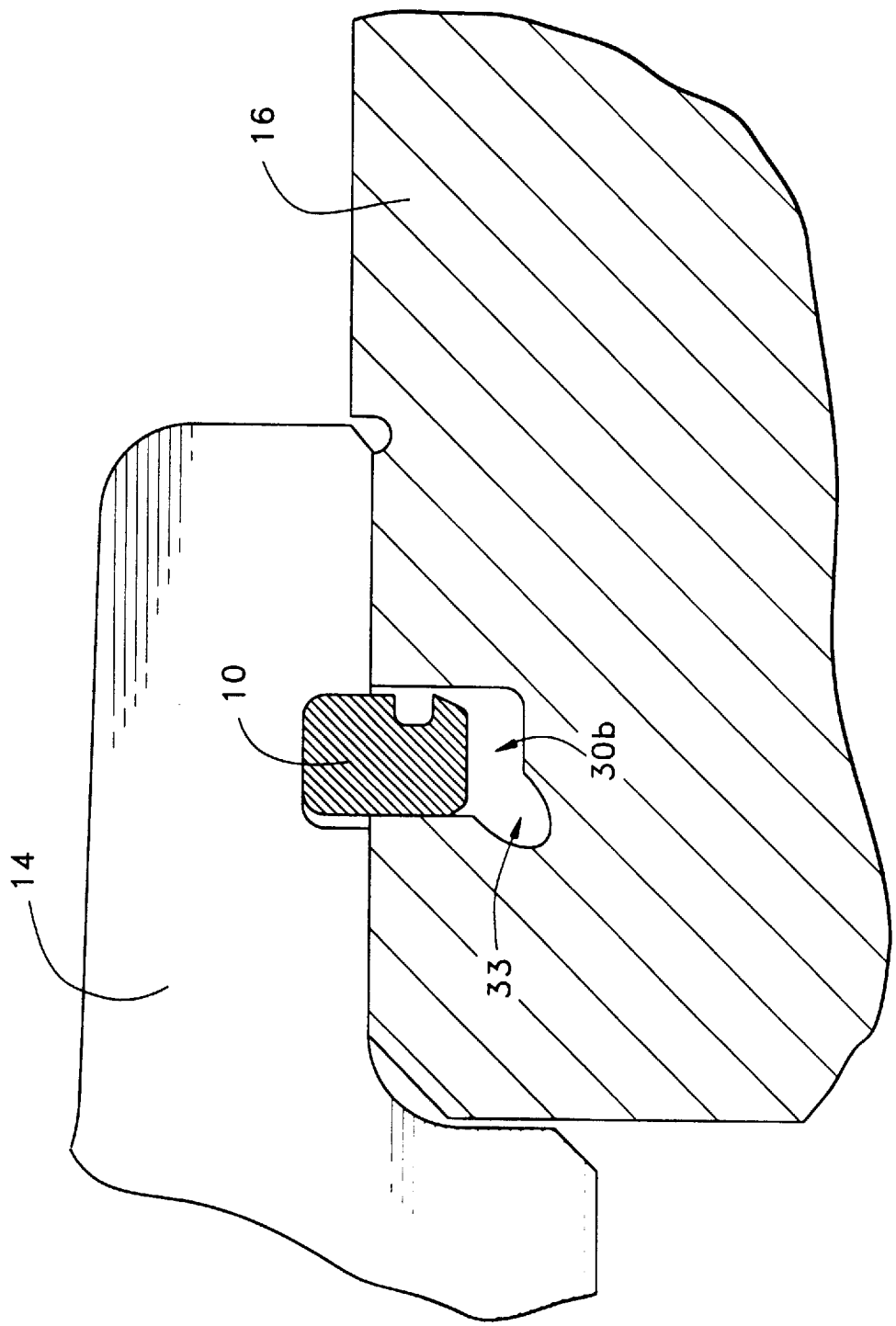

In circumstances in which groove 33 is employed, original ring key 10 may be installed into keyway 30a and 30b, as shown in FIG. 6C. Ring key 10,40, retaining ring 14 and rotor 12 may be assembled and re-installed.

In another aspect of the present invention, generator rotor 12 employing spacer ring 38a is provided as shown in FIG. 6B. Rotor 12 further includes plural longitudinal slots 18, windings 19 and wedges 20 disposed in slots 18, circumferential keyway 30b proximate each end of rotor 12, retaining ring 14 disposed on each of the two rotor ends, and ring key 10 disposed in keyway 30b and corresponding retaining ring keyway 30a. Spacer ring 38a may be formed by a process and of material similar to that of forming a key. Spacer ring may be a single ring with a radial slot or may be formed of segments. Preferably, spacer ring 38a has a thickness that corresponds to the dimension t of the machining step.

In yet another aspect of the present invention, a generator rotor 12 employing an enlarged key 40 is provided as shown in FIG. 6A. Enlarged key 40 may have a width increased by 2t in circumstances in which both inboard vertical wall 34b and an outboard vertical wall 34a is machined.

The present invention may be embodied in other specific forms without departing from the spirit or essential attributes thereof and, accordingly, reference should be made to the appended claims, rather than to the foregoing specification, as indicating the scope of the invention.

We claim:

1. A method for eliminating cracks in a generator rotor; the generator rotor, having a retaining ring disposed thereon, a keyway wall forming a circumferential keyway, a key disposed in the keyway, longitudinal slots, and slot contents disposed in the slots; comprising the steps of:

removing the retaining ring from the rotor;

removing the key from the keyway;

machining the crack from the keyway wall while the slot contents are disposed within the slots; and assembling the generator rotor, the key, and the retaining ring after the machining step.

2. The method of claim 1, wherein the machining step comprises turning the generator rotor in a lathe.

3. The method of claim 2, wherein the machining step comprises machining the keyway wall with a fixed machine tool.

4. The method of claim 1, wherein the machining step comprising machining the keyway wall with a rotating machine tool in a milling machine.

5. The method of claim 1, wherein the keyway wall includes two opposing substantially vertical keyway walls and a substantially horizontal keyway base wall disposed between the two vertical keyway walls to form a substantially rectangular keyway cross-sectional shape.

6. The method of claim 5, wherein the machining step comprises machining the horizontal keyway base wall and at least one of the vertical keyway walls.

7. The method of claim 6, further comprising the step of the inserting a spacer ring into the keyway proximate one of the vertical keyway walls.

8. The method of claim 5, wherein the machining step comprises machining a groove into at least one of the keyway walls to eliminate the crack.

9. The method of claim 5, wherein the machining step comprises machining a groove into a corner of the keyway that is formed by one of the vertical keyway walls and the horizontal keyway base wall.

10. The method of claim 9, wherein the groove has a substantially hybrid elliptical shape.

11. A generator rotor having:

plural slots longitudinally formed in the rotor;

slot contents disposed in the plural slots;

a rotor end;

a retaining ring, disposed on the rotor end, having a circumferential retaining ring keyway formed therein;

a circumferential enlarged rotor keyway formed in the rotor the enlarged rotor keyway opposing the retaining ring keyway while the retaining ring is disposed on the rotor end, the enlarged rotor keyway having a width that is larger than a width of the retaining ring keyway;

a key having an inner key portion and an outer key portion, the inner key portion disposed in the enlarged rotor keyway and the outer key portion disposed in the retaining ring keyway while the retaining ring is disposed on the rotor end; and means, disposed in and substantially around the circumference of the enlarged rotor keyway, for limiting longitudinal movement of the retaining ring relative to the rotor.

12. The generator rotor of claim 11, wherein the means for limiting longitudinal movement includes the inner key portion having a width corresponding to a width of the enlarged rotor keyway, and includes the outer key portion having a width corresponding to a width of the retaining ring keyway.

13. The generator rotor of claim 11, wherein the means for limiting longitudinal movement includes a spacer ring coupled to the enlarged rotor keyway.

* * * * *